United States Patent Office 2,695,298
Patented Nov. 23, 1954

2,695,298

FAST BASES OF THE AZOLE SERIES

Frederick Brody, New York, N. Y., and Robert S. Long, Bound Brook, N. J., assignors to American Cyanamid Company, New York, N. Y., a corporation of Maine No Drawing. Application March 1, 1952,
Serial No. 274,490

5 Claims. (Cl. 260—305)

This invention relates to compounds of the formula

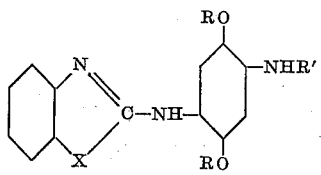

in which X is selected from the group of O and S, R' is selected from the group consisting of H and $R_2CO$ and R and $R_2$ are lower alkyl.

The production of azoic coloring matters of a greenish shade of blue and satisfactory fastness properties has been a considerable problem. Such coloring matters are rare and have been both expensive and frequently possess disadvantageous properties. We have found that the free bases of the present invention, that is to say, the compounds where R' is hydrogen, can be diazotized smoothly and when coupled with arylides of 2-hydroxy-3-naphthoic acid give blue azoic coloring matters of the very rare greenish shade, coupled with good fastness characteristics. While the rare greenish shades of blue constitute the most important azoic coloring matters which can be prepared from the dyestuffs of the present invention, the invention is not limited thereto as a wide range of other shades may be obtained by using different coupling components.

While the present invention is not limited to any particular method of preparing the compounds, we have found that a very suitable method is the condensation of 2-halo-benzoxazoles or -benzothiazoles with a 2,5-dialkoxy-4-aminoacyl anilide. The acylamino group can then be readily hydrolyzed to the corresponding free amines without damaging the azole ring structure. It is not known why the hydrolysis does not affect the azole ring and the invention is not intended to be limited to any theory of action. The invention is not limited to the use of a particular dialkoxy amino acyl anilide, but acyl groups of the lower fatty acids, such as acetyl, propionyl, etc., may be used. However, the acetanilides are available so cheaply and inexpensively that they constitute the preferred raw material. The lower alkyl group represented by R may be any of the ordinary lower alkyl groups, such as methyl, ethyl, propyl, etc.

It is an advantage of the present invention that the diazotized free bases may be used in various methods of forming azoic coloring matters. Thus, pigments may be obtained by direct coupling with a suitable coupling component or the coupling component may be padded onto fabrics and the color developed by adding the diazo compound, or stable derivatives of the diazo compound, such as diazoamino compounds, may be incorporated in the suitable azoic printing pastes, the final color being developed by acid in the usual manner.

Among the ice color coupling components which may be used for this purpose are such compounds as beta-naphthol, 8 - amino - 2 - naphthol, 8 - acetylamino - 2 - naphthol, benzyl naphthols, pyrazolones, hydroxybenzofluorenones and the various N-substituted amides such as arylides of 2-hydroxy-3-naphthoic acid, 2-hydroxy-3-anthroic acid, of methyl and dimethylsalicylic acids, of hydroxybenzacridone carboxylic acids, hydroxybenzofuran carboxylic acids, of hydroxybenzothiophene carboxylic acids, of acetoacetic acid, of benzoylacetic acid and the like.

This invention is further illustrated by the following examples. Where not otherwise noted, parts are by weight.

Example 1

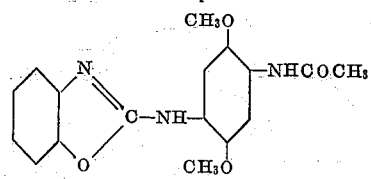

A mixture of 2.1 parts of 2,5-dimethoxy-4-aminoacetanilide, 3.07 parts of 2-chlorobenzoxazole and 2 parts of N hydrochloric acid in 50 parts of 50% dioxane-water is refluxed. Condensation is rapid. The mixture is then cooled, drowned and filtered. The product may be crystallized from ethanol.

Example 2

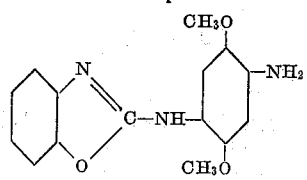

A mixture of 8.0 parts of the product of Example 1 and 120 parts of concentrated hydrochloric acid in 200 parts of ethanol is refluxed briefly, drowned, made alkaline with ammonia and filtered. The product may be recrystallized from ethanol. Too long refluxing should be avoided, since it tends to cause rupture of the oxazole ring with formation of 2,5-dimethoxy-p-phenylenediamine.

Example 3

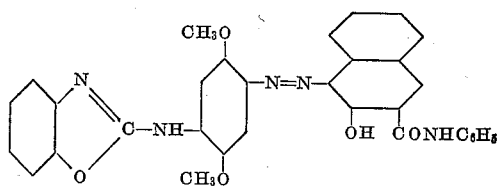

Blue dyeings are obtained in the ordinary way by diazotizing the above-prepared base with sodium nitrite and hydrochloric acid, and using the resulting diazo solution to develop cloth padded with an alkaline solution of 2-hydroxy-3-naphthoic anilide.

Example 4

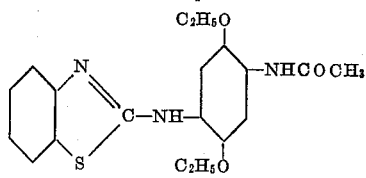

A mixture of 17.0 parts of 2-chlorobenzothiazole, 23.8 parts of 2,5-diethoxy-4-aminoacetanilide and 10 parts of N hydrochloric acid in 250 parts of 50% dioxane-water is refluxed until condensation is complete. The mixture is then cooled, drowned in 500 parts of water and filtered. A good yield of product is obtained.

Example 5

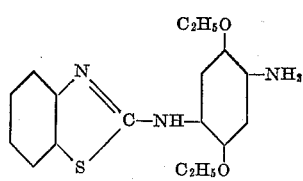

A mixture of 3.71 parts of the product of Example 4 with 12 parts of concentrated hydrochloric acid and 20 parts of ethanol is refluxed until hydrolysis is complete, drowned in 125 parts of water and then made alkaline with sodium hydroxide. On filtration, an excellent yield of product is obtained, which may be recrystallized from ethanol.

*Example 6*

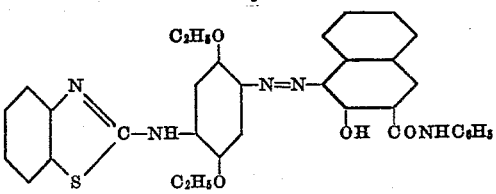

The product of Example 5 is diazotized in the normal way and used to develop cloth padded with 2-hydroxy-3-naphthoic anilide. It gives blue dyeings of extremely greenish shade and good fastness properties.

We claim:
1. A compound of the formula

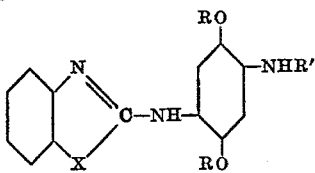

in which X is selected from the group consisting of O and S, R' is selected from the group consisting of H and $R_2CO$ and R and $R_2$ are lower alkyl.

2. A compound of the formula

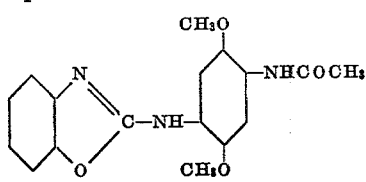

3. A compound of the formula

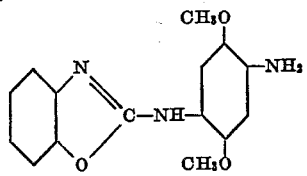

4. A compound of the formula

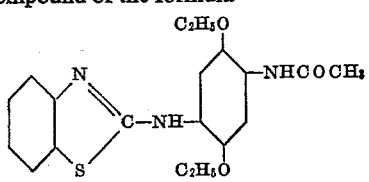

5. A compound of the formula

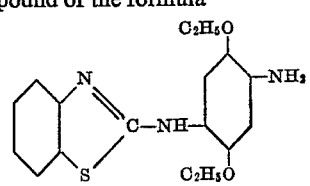

References Cited in the file of this patent

UNITED STATES PATENTS

| Number | Name | Date |
|---|---|---|
| 2,061,632 | Lenher | Nov. 24, 1936 |
| 2,093,214 | Schrader et al. | Sept. 14, 1937 |
| 2,439,804 | Haddock | Apr. 20, 1948 |